United States Patent [19]

Kato et al.

[11] 4,311,224

[45] Jan. 19, 1982

[54] TORQUE LIMITER

[75] Inventors: Heizaburo Kato; Yoshio Ogawa; Masao Nishioka, all of Tokyo, Japan

[73] Assignee: Kabushiki Kaisha Sankyo Seisakujo, Tokyo, Japan

[21] Appl. No.: 63,646

[22] Filed: Aug. 3, 1979

[30] Foreign Application Priority Data

Aug. 24, 1978 [JP] Japan ................................ 53-102361
Feb. 9, 1979 [JP] Japan .................................. 54-13295

[51] Int. Cl.³ .......................... F16D 7/02; F16D 43/20
[52] U.S. Cl. ..................................... 192/56 R; 64/29; 403/369; 403/374
[58] Field of Search ............... 192/56 R; 64/28 R, 29; 403/369, 374

[56] References Cited

U.S. PATENT DOCUMENTS

| 1,805,692 | 5/1931 | Ferenci | 192/56 R X |
| 2,514,227 | 7/1950 | Dodge | 192/56 R X |
| 2,755,093 | 7/1956 | Peter et al. | 403/369 X |
| 3,298,481 | 1/1967 | Schaedler et al. | 192/0.034 |
| 3,405,790 | 10/1968 | Orwin et al. | 192/56 R |
| 3,667,250 | 6/1972 | Schnepel | 64/29 |
| 4,041,729 | 8/1977 | Bilz | 192/56 R X |

FOREIGN PATENT DOCUMENTS

| 2-1 | of 1927 | Japan . | |
| 13-19643 | of 1938 | Japan . | |
| 14-5334 | of 1939 | Japan . | |
| 14-7673 | of 1939 | Japan . | |
| 36-10857 | of 1961 | Japan . | |
| 37-1713 | of 1962 | Japan . | |
| 38-23850 | of 1963 | Japan . | |
| 41-443 | of 1966 | Japan . | |
| 48-31351 | of 1973 | Japan . | |
| 49-51438 | of 1974 | Japan . | |
| 52-19846 | 2/1977 | Japan | 192/56 R |
| 479904 | 12/1975 | U.S.S.R. | 192/56 R |

Primary Examiner—Rodney H. Bonck
Attorney, Agent, or Firm—Neuman, Williams, Anderson & Olson

[57] ABSTRACT

A torque limiter includes a rotational driving member and a driven member aligned along the common axis. A plurality of axially extended arcuate recesses are formed on the outer periphery of an interlocking ferrule fitted over a rotational driving member, and also a plurality of radially extended grooves, matched with the arcuate recesses of the interlocking ferrule, are formed on the inner periphery of an interlocking ferrule fitted over a driven member opposed to the driving member. In each of the radial grooves, there is fitted a torque-transmitting steel ball in such a manner that it can only move radially and rotate about its own axis while it is confined in motion in the revolving and axial directions. As long as they transmit torque less than a preset critical level, these balls are biased diametrally inward by an elastic pressure means so that the rotational driving member and the driven member are integrally driven together. If any amount of torque exceeding the critical level is applied between the two members, the torque-transmitting steel balls being pressed against the arcuate recesses of the driving member and the radial grooves of the driven member will overcome the action of the elastic pressure means and will move radially outward along the radial grooves, thus allowing the driving and driven members to rotate relative to each other.

4 Claims, 16 Drawing Figures

TORQUE LIMITER

BACKGROUND OF THE INVENTION

This invention relates to improvements in torque limiter and in an elastic pressure means for torque-transmitting steel balls of the limiter.

In general, the torque limiter functions to set a so-called critical torque, or a maximum limit of torque, more than which should not be applied between two machine elements. Whenever any excessive torque beyond the preset critical level is applied to one element on either side, the torque limiter will work to shut off the transmission of the torque to the other element. By this critical torque setting the limiter protects the machine, prevents an accident which might otherwise result in injury or death of the personnel, and provides useful means for torque control which may be incorporated in the mechanism of equipment.

The torque limiter interposed between the two machine elements must meet roughly the following three characteristic requirements:

(1) Characteristic during normal operation (with no more than the critical torque)

The transmission of torque between two machine elements should be such that, as though the two are solidly fastened together by a rigid body (e.g., a rigid shaft or a pair of flanges), the torque acting on one machine element is exactly transmitted to the other without any loss.

(2) Characteristic during abnormal operation (with more than the critical torque)

The torque limiter is a safety device as already noted, and any torque in excess of the preset critical value must be positively shut off by the limiter and kept from transmission to the other machine element. Moreover, the limiter is not desirable if its critical torque setting varies largely with the conditions under which the device is used; the limiter is desired to work accurately whenever the preset value is reached. A limiter capable of generating a shut off signal is preferred.

(3) Release characteristic

The characteristic of a torque limiter which has once shut off the torque transmission between two machine elements is desirably such that the two elements are completely free from each other, neither of which imparting any force to the other. The limiter is preferably of the type that needs external force for its resetting.

Heretofore, shear pins, shear plates, and shear rings have been employed as torque limiters that meet the foregoing characteristic requirements. They are of the breakdown or fracture type, so called because, when subjected to a shearing force greater than the allowable shearing stress due to application of an excessive torque, such a device is broken to shut off the torque transmission. (The transmissible torque corresponding to the allowable shearing stress is herein called the critical torque.) They have thus far been abundantly used as safety devices for many machines and appliances.

The fracture type devices are generally inexpensive and, once broken to shut off the torque transmission, they will not reset by themselves. In this sense they have been deemed more dependable for safe operation than torque limiters of other types, such as friction and ball types. The fracture type has, however, drawbacks. The most serious of the disadvantages is that, because the devices depend on the strength properties of material for the limiter action, they can sometimes be broken by the fatigue of the material itself even when the torque being transmitted is below the critical level. In certain applications, the devices do not always provide the safety in operation. In addition, they cannot in any way meet the requirements for torque control, sensing of overload, accommodation of misalignments, etc. For these reasons there has been a great need for a novel torque limiter which will replace those of the known types.

Japanese Patent Application Publication No. 23850/1963 and Patent Application Public Disclosure Nos. 31351/1973 and 51438/1974 disclose torque limiters of the so-called ball type in which balls move in axial directions to transmit or resist a torque. The proposed devices are still too unsatisfactory for torque control, overload detection, accommodation of misalignments, and other requirements.

A principal object of this invention, therefore, is to provide a novel, improved torque limiter which transmits torque and shuts it off by allowing torque-transmitting steel balls to move only radially of driving and driven members but confining the ball motion in the rotational and axial directions.

It is another object of the invention to provide an improved torque limiter which can be exactly set to a critical torque for overload release by merely turning an adjust nut.

Another object of the invention is to provide a torque limiter for which radial slots to be formed jointly by driving and driven members to receive torque-transmitting steel balls can be simultaneously made by simple machining means, with the slot-forming portions of the two members in complete register, whereby the backlash in the rotational direction of the driving and driven members is reduced to a minimum and the irregularity in rotation during torque transmission is minimized.

Still another object of the invention is to provide a torque limiter capable of accommodating the relative axial and radial displacements of the driving and driven members and the errors of deviation of the two members from the common center of rotation.

Yet another object of the invention is to provide a torque limiter having the functions of the so-called one-point setting system which can perform overload release and resetting most effectively and, once the torque transmission has been shut off, the limiter cannot reset at any other point than the shutoff point.

An additional object of the invention is to provide a torque limiter for which the overload critical torque decreases according to the rotational speed and which can simply generate an overload signal.

A further object of the invention is the provision of a torque limiter which provides high degrees of freedom for mounting, fastening, and tightening, is simple in construction, low at manufacturing cost, and has long service life.

Still a further object of the invention is to provide an elastic pressure means for torque-transmitting steel balls of a torque limiter, which can elastically and positively hold the steel balls in position and enable the limiter to accomplish the action as such smoothly and effectively.

SUMMARY OF THE INVENTION

The foregoing objects are realized, in accordance with the present invention, by a torque limiter of a construction such that a plurality of axially extended arcuate recesses are formed on the outer periphery of an interlocking ferrule fitted over a rotational driving member, and also a plurality of radially extended grooves, matched with the arcuate recesses of the interlocking ferrule, are formed on the inner periphery of an interlocking ferrule fitted over a driven member opposed to the driving member, in each of said radial grooves a torque-transmitting steel ball being fitted in such a manner that it can only move radially and rotate about its own axis while it is confined in motion in the revolving and axial directions, and as long as they transmit torque less than a present critical level, these balls are biased diametrally inward by an elastic pressure means so that the rotational driving member and the driven member are integrally driven together and if any amount of torque exceeding the critical level is applied between the two members, the torque-transmitting steel balls being pressed against the arcuate recesses of the driving member and the radial grooves of the driven member will overcome the action of the elastic pressure means and will move radially outward along the radial grooves, thus allowing the driving and driven members to rotate relative to each other. In preferred embodiments of the invention, the driving and driven members are replaced with each other or the numbers of arcuate recesses and radial grooves engageable therewith are a plurality and odd number each.

The elastic pressure device for torque-transmitting steel balls according to the invention, which permits the torque limiter to function smoothly and effectively, is built so as to bias the steel balls diametrally inward by elastic pressure means consisting of a compression spring, a pressure nut, a first taper thrust ring, a group of small thrust steel balls, and a second taper thrust ring.

Thus, the present invention is outstandingly useful as it achieves the above-mentioned purposes of "(A) possibility of overload release, (B) accurate adjustability of critical torque setting against overloading, (C) minimization of backlash in the rotational direction, (D) simple generation of overload signal, (E) minimum of irregularity in rotation during torque transmission, (F) accommodation of misalignments, i.e., (a) error in angularity, (b) error in parallelism, and (c) error in gap, that may arise between two axes, (G) high degrees of freedom in mounting, fastening, and tightening, (H) reducibility of the overload critical torque according to the rotational speed, and (I) simplicity in design, low manufacturing cost, and long service life.

BRIEF DESCRIPTION OF THE DRAWINGS

These and other objects and advantages of the invention will be more clearly understood from the following description taken in conjunction with the accompanying drawings showing embodiments thereof. In the drawings.

DESCRIPTION OF THE PREFERRED EMBODIMENTS

Referring now to the drawings, specifically to FIGS. 1 to 4, the torque limiter according to the invention will be described in detail.

Figure 1:
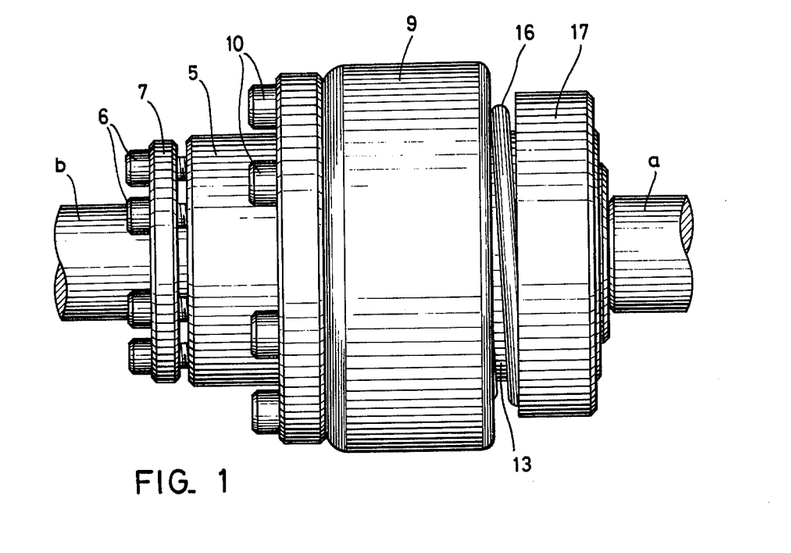
FIG. 1 is a front view of a torque limiter embodying the invention.
Figure 2:
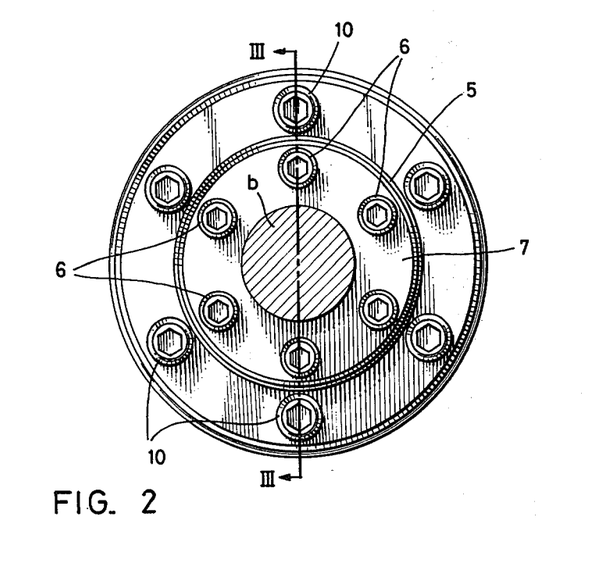
FIG. 2 is a side view as seen from the left side of FIG. 1.
Figure 3:
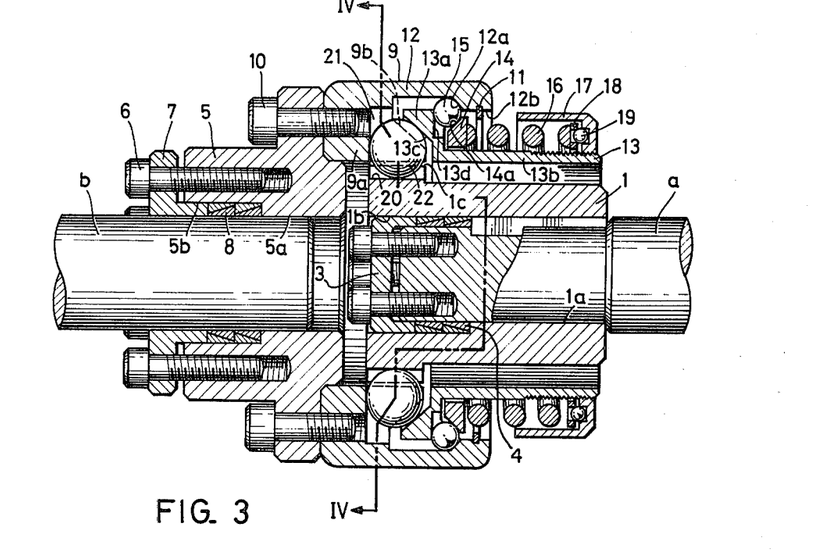
FIG. 3 is a sectional view looking in the direction of the arrows III—III of FIG. 2.

The torque limiter of the invention carries a rotational driving member a and a driven member b on opposite ends and along the common axis. The driving member a includes a front end portion of a reduced diameter fitted in and keyed to the bore 1a of an interlocking ferrule 1. The bore 1a of the ferrule is somewhat increased in diameter inwardly to provide a larger coaxial bore 1b, and in the cylindrical space defined between this bore 1b and the small-diameter front end portion of the rotational driving member a there are provided Spanrings 4 and a retainer 3 pressing the Spanrings 4 axially against the rear end wall of the cylindrical space. As shown, the retainer 3 is cap-shaped, with its open end kept in contact with the inner end of the inner Spanring, and is fastened by locking bolts 2 to the front end of the rotational driving member a. Tightening the bolts enables the cap-shaped retainer to compress the Spanrings 4 to provide a complete joint between the driving member a and the ferrule 1. Similarly, the driven member b includes a rear end portion inserted in the bore 5a of an interlocking ferrule 5. In a cylindrical space defined between a somewhat enlarged bore portion 5b coaxial with the bore 5a and the driven member 6, Spanrings 8 are fitted and urged rearwardly by a ring-shaped retainer 7. As shown, the cylindrical portion of the retainer is fitted partly in the cylindrical space between the driven member b and the interlocking ferrule 5, and kept in contact with the Spanrings 8, while the flanged portion of the retainer has holes through which locking bolts 6 fasten the retainer to the ferrule 5. As the bolts are tightened the retainer compresses the Spanrings to provide a solid joint between the driven member b and the interlocking ferrule 5.

Figure 4:
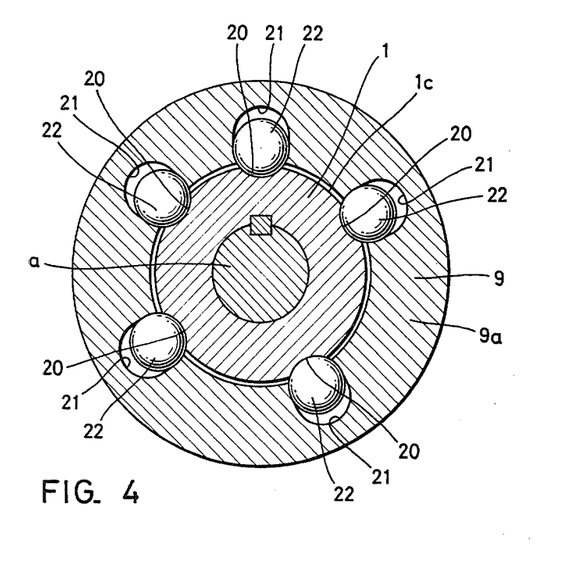
FIG. 4 is a sectional view taken along the line IV—IV of FIG. 3.
Figure 5A:
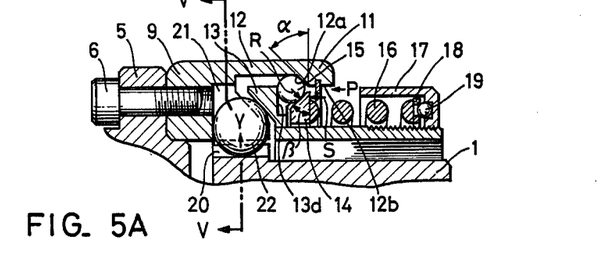
FIG. 5A is a fragmentary sectional view explanatory of the limiter in operation.

To the interlocking ferrule 5 is secured, by clamping bolts 10, a coupling cylinder 9 which is so disposed as to cover at least a part of the interlocking ferrule 1 fast on the rotational driving member a. To be more exact, the coupling cylinder 9 consists of a boss 9a directly attached to the ferrule 5 and cylindrical skirt 12 extended from the outer periphery of the boss 9a and protruding axially. The inside diameter of the boss 9a is greater than the outside diameter of a larger-diameter portion 1c formed at the front end of the interlocking ferrule 1. This enables the ferrule 1 to revolve freely within the coupling cylinder 9. Along the inner periphery of the boss 9a of the coupling cylinder, there are formed a plurality of radially extended grooves 21. To mate with these grooves, corresponding recesses 20, arcuate in section, extend axially on the outer periphery of the large-diameter portion 1c of the ferrule 1. As can be seen from FIG. 4, the grooves 21 and the corresponding recesses 20 are radially matched in pairs to form elliptical slots, but the adjacent pairs vary in angle to one another as measured circumferentially. From this relationship it will be appreciated that the grooves 21 of the coupling cylinder 9 and the recesses 20 of the large-diameter portion 1c are all in complete register only when the two elements are in one relative position as shown in FIG. 4. In the elliptical slot formed by each pair of the groove 21 and the matching recess 20 is placed a steel ball 22 for torque transmission, which can move radially within the groove 21 out of engagement with the recess 20. The radially outer portion of each groove 21, that is, of the boss 9a, is chamfered at 9b to permit partial exposure of the steel ball 22. Over the ferrule 1 is fitted a taper thrust sleeve 13 which consists of a sleeve body 13b surrounding the ferrule and extending coaxially therewith, terminating with a flange 13a. In order to constrain and keep contact with the torque-transmitting steel balls 22, the flange 13a is recessed at the front end with an annular slope 13c. Steel balls 15 are disposed in the space formed between the vertical rear face 13d of the flange 13a and an annularly tapered inner end portion 12a of the cylindrical skirt of the coupling cylinder 9. They are retained in place by a taper thrust ring 14 having an annularly tapered outer end portion 14a and loosely fitted on the sleeve body 13b of the taper thrust sleeve 13. On the inner peripheral surface 12b of the skirt is fitted a stop ring 11. In this arrangement, the angles of inclination that the annularly tapered inner end portion 12a of the cylindrical skirt of the coupling cylinder 9 and the annularly tapered outer end portion 14a of the taper thrust ring 14, both in contact with the steel balls 15, make to the vertical are, respectively, α and β, as indicated in FIG. 5A. The taper thrust ring 14 is biased axially forward by a coiled torque spring 16 which, in turn, is held between the ring and a pressure nut 17 threadedly engaged with the outer surface of the taper thrust sleeve 13. The axial pressure P applicable to the taper thrust ring 14 can be adjusted by turning the pressure nut 17. Between this pressure nut 17 and the torque spring 16 are provided steel balls 19 and a non-rotational retaining ring 18 to insure smooth functioning of the pressure nut 17.

The taper thrust sleeve 13 receives axial power from the taper thrust ring 14 through the steel balls 15. The sleeve 13, in turn, urges the torque-transmitting steel balls 22 radially inward which the grooves 21 of the coupling cylinder 9 into a engagement with the recesses 20 of the interlocking ferrule 1 as in FIGS. 3 and 4.

Now the operation of the torque limiter according to the present invention will be explained with reference to FIGS. 3, 4, 5A, 5B, 6A and 6B.

Figure 5B:
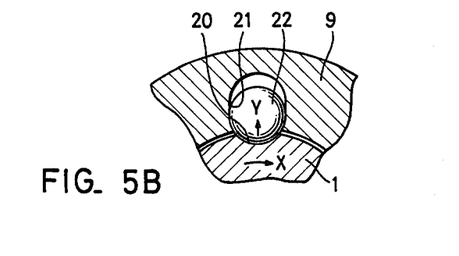
FIG. 5B is a sectional view taken along the line V—V of FIG. 5A.
Figure 6A:
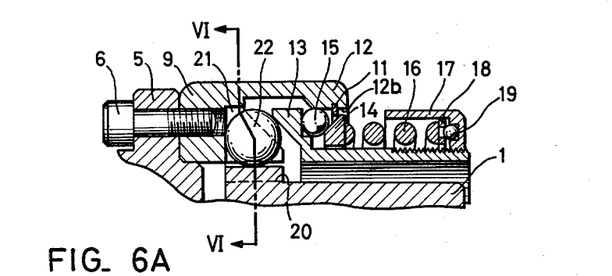
FIG. 6A is a fragmentary sectional view showing the relative position of a groove and a torque-transmitting steel ball under overload.
Figure 6B:
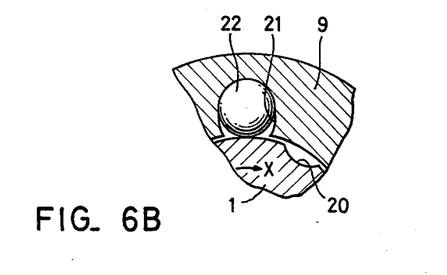
FIG. 6B is a sectional view taken along the line VI—VI of FIG. 6A.

Driving power is input to the torque limiter in the position shown FIG. 3, via the rotational driving member a. The power is thus transmitted through the interlocking ferrule 1, torque-transmitting steel balls 22, coupling cylinder 9, and interlocking ferrule 5 to the driven member b. If, during this, any load exceeding a certain limit is applied between the rotational driving and driven members a and b, each of the torque-transmitting steel balls 22 is caused to move in the radially outward direction of the arrow Y, as shown in FIGS. 5A and 5B, against the deviating force with which the taper thrust sleeve 13 urges the ball radially inward, by the associated recess 20 of the interlocking ferrule 1 rotating with the driving member a in the direction X. The movement in the direction Y of the torque-transmitting steel balls 22 is accompanied with the axial movement of the taper thrust sleeve 13 in the direction reverse to the arrow S. Meanwhile, the steel balls 15 are guided by the vertical rear face 13d of the taper thrust sleeve 13 and the annularly tapered inner end portion 12a of the cylindrical skirt of the coupling cylinder 9 to move in the direction of the arrow R into contact with the inner peripheral surface 12b of the skirt. Thereupon they force the taper thrust ring 14 in the direction opposite to the arrow S, overcoming the biasing force of the torque spring 16. (Refer also to FIG. 6A.) Eventually as shown in FIGS. 6A and 6B, the torque-transmitting steel balls 22 are disengaged from the recesses 20, allowing the rotational driving member a to run idle and thus shutting off the transmission of power from the driving member a to the driven member b.

The functions of the torque limiter embodying the invention will be described in detail below.

Torque transmission and shutoff

As already described, the interlocking ferrule 1 on the rotational driving member a has the axially extended arcuate recesses 20 on its outer periphery, the inner periphery of the coupling cylinder 9 corresponding to the driving member has radially elongated grooves 21, and the torque-transmitting steel balls 22 are placed in the slots formed by the pairs of axially extended arcuate recesses and the radial grooves, in such a manner that they are movable only radially but are restrained from movement in the revolving and axial directions, said steel balls being urged diametrally inward by elastic pressure means for disposing the balls to permit their own rotation and defining the critical torque to be transmitted. With this construction the limiter enables the driving and driven members to run integrally. If any amount of torque exceeding the preset critical level is applied between the two members, the steel balls being pressed against the arcuate recesses of the driving member will overcome the action of the elastic pressure means and will move radially outward along the opposite grooves, thus allowing the driving and driven members to rotate freely relative to each other.

Coupling function and accommodation of misalignments

Figure 8:
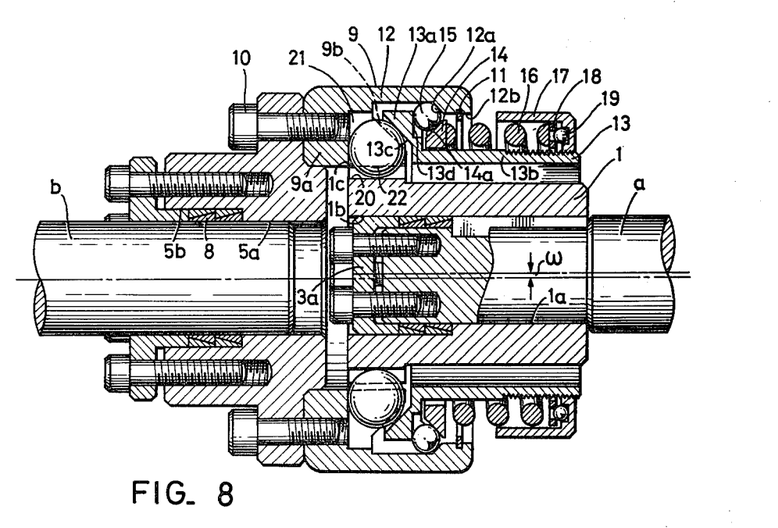
FIG. 8 is a view similar to FIG. 7 but explanatory of an error in parallelism.
Figure 9:
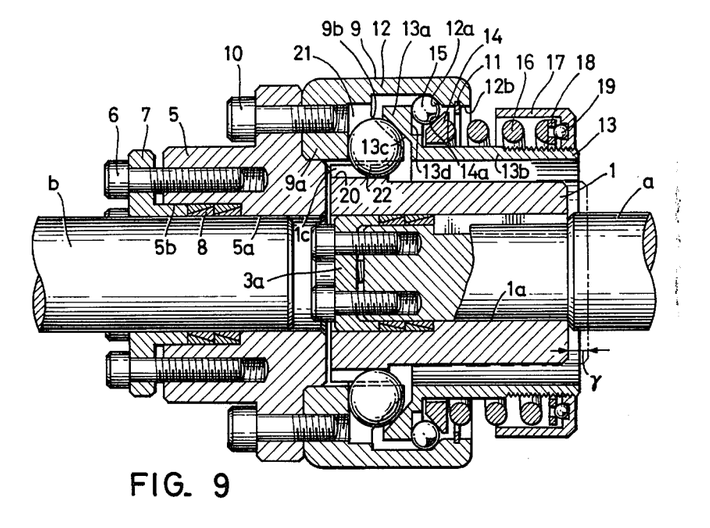
FIG. 9 is a view similar to FIG. 8 but explanatory of an error in gap.

The amount of relative axial displacement γ between the driving and driven members (FIG. 9) is frictionally taken up and reduced to zero by the movement, in frictional contact with the grooves, of the steel balls being pressed by the elastic pressure means against the axially extended arcuate recesses formed on the periphery of the driving member. Also, the amount of relative diametral displacement (ω) between the driving and driven members (FIG. 8) is elastically absorbed as the steel balls, which are being pressed diametrally inward by the elastic pressure means against the radial grooves machined on the inside of the driven member to extend radially, overcome the elasticity and move along the grooves just by the amount of displacement.

Figure 7:
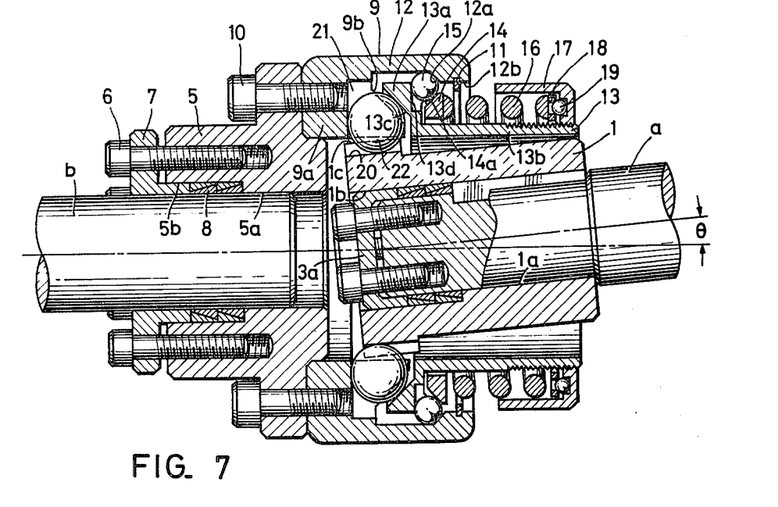
FIG. 7 is a longitudinally sectional view explanatory of an error in angularity.

Further, the error in declination ($\theta$) to the common rotational center of the driving and driven members (FIG. 7) is corrected by the simultaneous axial frictional movement and diametral elastic movement of the steel balls. Thus, the misalignments that may arise between the two axes [i.e., the errors in declination ($\theta$), in parallelism ($\omega$) and in gap ($\gamma$) between the two shafts] can be accommodated.

Minimized backlash and irregularity in rotation

The driving member having the axially extended arcuate recesses on the periphery and the driven member having the radially extended grooves corresponding to the recesses are of such contours that, by simple machining means, the recesses and corresponding grooves are formed concurrently and they are matched in complete register when the torque-transmitting steel balls, made to have a diameter equal to the width of the recesses and grooves, are placed in the slots formed by the pairs of recesses and grooves. Use of the elastic pressure means reduces the backlash between the driving and driven members in the rotational direction to a minimum, making possible the exact transmission of the rotational displacement in an integral way. Another feature is that, by increasing the number of recesses and grooves and also the number of corresponding steel balls, the unevenness in rotation with the torque being transmitted is minimized, even though there may be any misalignment between the two shafts.

One-point setting system

In the arrangement of the several slots formed by the pairs of recesses and grooves and the several torque-transmitting steel balls corresponding to the slots, the angles of their distribution are ununiform. This means that the torque limiter of the invention has the function of the so-called one-point setting system, with which the limiter that has once shut off the torque transmission upon application of an overload resets only to the position where it effected the shutoff.

Adjustment of critical torque

The elastic pressure means is a means for elastically urging, in the concentric directions, the torque-transmitting steel balls located on the outer periphery of the interlocking ferrule having the axially extended arcuate recesses and disposed in the radial grooves of the coupling cylinder having the radially extended grooves mated with the recesses. The construction is such that the axial force of the taper thrust ring under the urging of the torque spring pushes the steel balls held between the taper thrust sleeve and the taper thrust ring diametrally outward, by dint of the angle of contact between the two taper thrust elements, until the balls contact the tapered portion on the inside of the coupling cylinder. Consequently, a component of the force moves the taper thrust sleeve axially forward, so that the torque-transmitting steel balls in contact with the tapered portion of the taper thrust sleeve are forced concentrically. Adjustment of the critical torque setting is done by turning the pressure nut in thread engagement with the outer periphery of the taper thrust sleeve suitably to increase or decrease the pressure being applied to the torque spring.

In the event of an overload, the steel balls pressed against the arcuate recesses of the interlocking ferrule counteract the elastic pressure means and move away from the recesses, while forcing the taper thrust ring axially backward, to shut off the transmission of torque.

Release function

The torque limiter includes a mechanism whereby, once released for a shutoff action, the limiter will not resume the torque transmission unless some external force is applied. The overload release is performed by the elastic pressure means in coaction with the flat portion 12b adjacent the tapered portion 12a formed on the inside of the coupling cylinder 9.

The release on application of an overload is accomplished in the following way. The steel balls pressed against the arcuate recesses of the interlocking ferrule overcome the pressure being exerted by the elastic pressure means and move radially along the grooves of the coupling cylinder. Accordingly, the taper thrust sleeve, with its tapered portion in contact with the balls, is forced axially backward. On the other hand, the steel balls interposed between the taper thrust ring and the taper thrust sleeve move radially inward, while compressing the torque spring, in defiance of the elastic pressure being exerted by the pressure nut and the torque spring. Thus, the balls travel along the tapered portion 12a formed on the inside of the coupling cylinder and also along the flat portion 12b contiguous to the tapered portion. Consequently, the diametrally outward forces of the steel balls do not impart any axial force to the taper thrust sleeve and, even after the removal of the overload, the torque-transmitting steel balls will not enter the arcuate recesses of the interlocking ferrule. (Refer to FIG. 6A.)

When resetting the torque limiter, the elastic pressure means need only to be pushed somehow or other to the original position.

Figure 10:
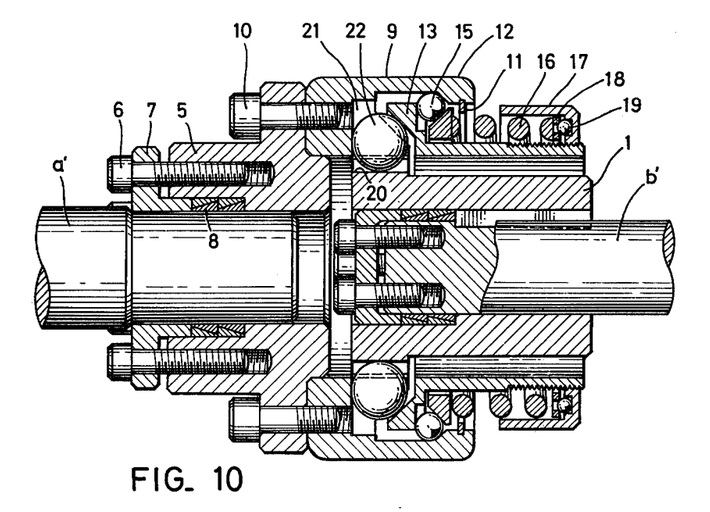
FIG. 10 is a longitudinally sectional view of another embodiment of the torque limiter of the invention.
Figure 11:
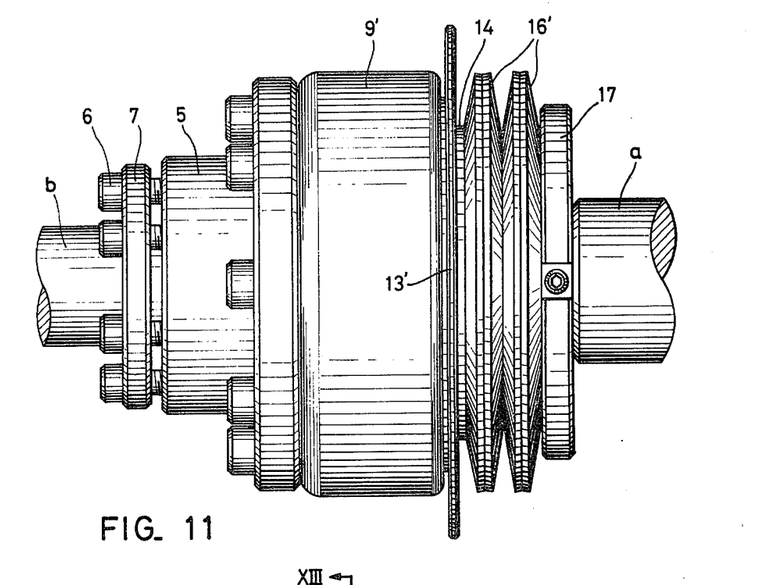
FIG. 11 is a front view of yet another embodiment of the torque limiter equipped with an elastic pressure device for torque-transmitting steel balls according to the invention.
Figure 12:
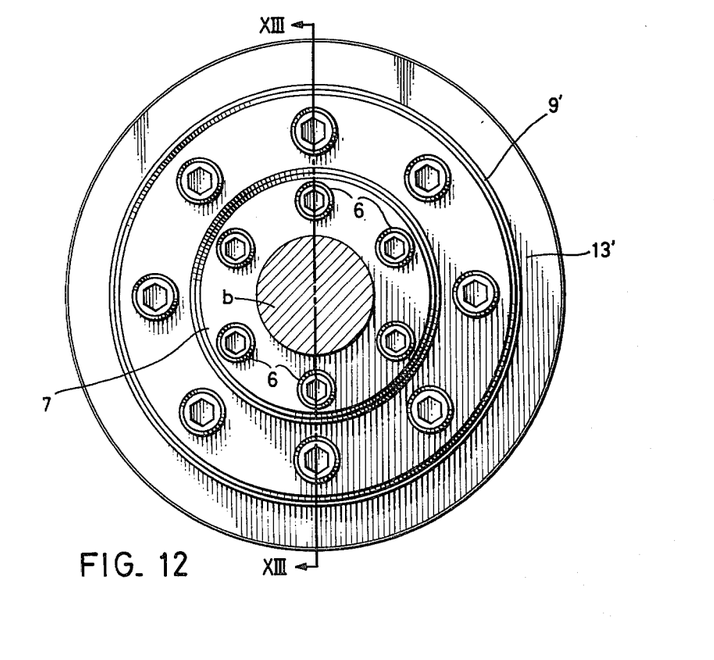
FIG. 12 is a side view as seen from the left side of FIG. 11.

FIG. 10 illustrates another embodiment of the torque limiter of the invention, which differs from the first embodiment simply in that the rotational driving and driven members are reversed in relative position. Therefore, the torque is transmitted contrariwise, i.e., from the rotational driving member a' that replaces the driven member b of the preceding embodiment to the driven member b' in place of the driving member a, through the coupling cylinder 9 and the torque-transmitting steel balls 22. If an amount of torque greater than a certain limit is applied between the driving and driven members, the torque-transmitting steel balls 22 pressed against the arcuate recesses of the driven member b' will move radially outward along the radial grooves 21 of the rotational driving member, defying the action of the elastic pressure means, thereby causing the driving member a' to run without load and shutting off the transmission of power from the driving member a' to the driven member b'. It will be readily understood by those skilled in the art that this embodiment of torque limiter functions in the same way as the first embodiment already described.

FIGS. 11 to 14 show a modified form of the elastic pressure means for urging the torque-transmitting steel balls radially inwardly along radial grooves formed on the rotating driving member. The parts other than the elastic pressure means are the same as those of the torque limiter shown in FIG. 3 and are therefore given like reference numerals without repetition of the detailed description.

Figure 13:
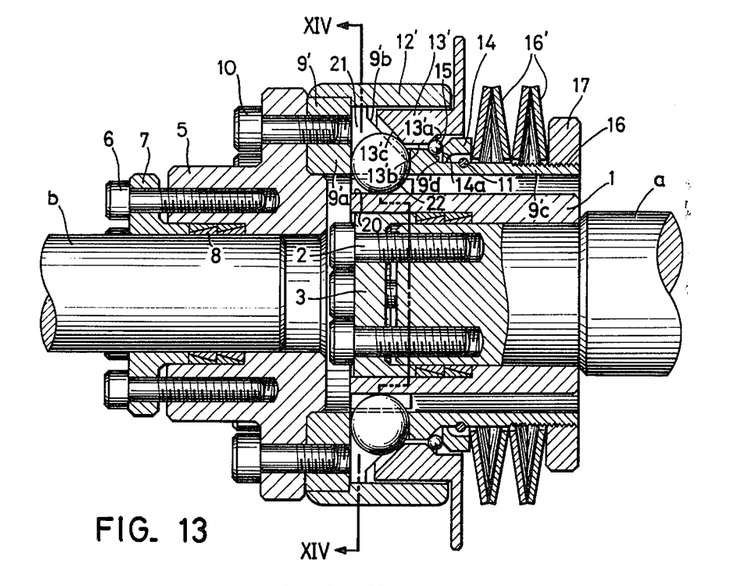
FIG. 13 is a sectional view looking in the direction of the arrows XIII—XIII of FIG. 12.

Turning specifically to FIG. 13, the torque limiter is shown with a construction as follows. A plurality of axially extended arcuate recesses 20 are formed on the outer periphery of an interlocking ferrule 1 fitted over a rotational driving member a, and also a plurality of radially extended grooves 21, matched with the arcuate recesses 20 of the interlocking ferrule 1 on the rotational driving member a, are formed along a boss 9'a of a coupling cylinder 9 fastened by coupling bolts 10 to interlocking ferrule 5 fitted over a driven member b opposed to the driving member a. In each of the radial grooves 21, there is fitted a torque-transmitting steel ball 22 in such a manner that it can only move radially and rotate about its own axis while it is confined in motion in the revolving and axial directions. These torque-transmitting steel balls 22 are biased diametrally inward by an elastic pressure means, which consists of Belleville springs 16', a pressure nut 17, a taper thrust ring 14, a group of small thrust balls 15 of steel, and a taper thrust ring 13', so that the rotational driving member a and the driven member b are integrally driven together.

Figure 14:
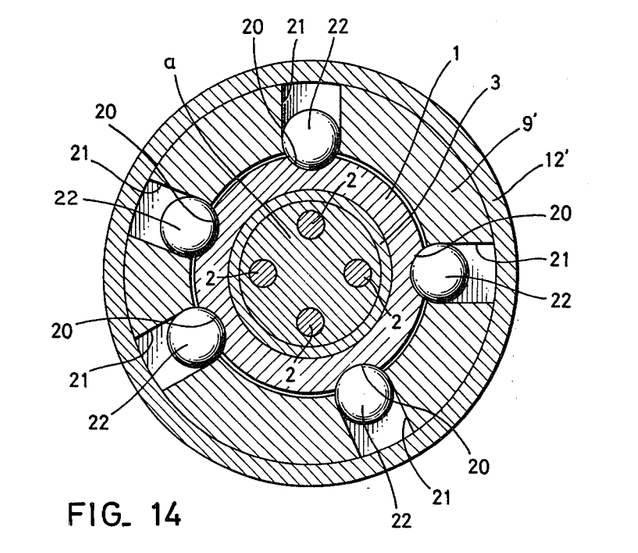
FIG. 14 is a sectional view taken along the line XIV—XIV of FIG. 13.

The elastic pressure means will now be explained in more detail. The coupling cylinder 9' includes three portions, i.e., a boss 9'a, which is formed with radially extended grooves 21, a sleeve 9'c joined to the boss 9'a along the inner periphery, and a cylindrical skirt 12' which is integrally secured to the boss 9'a along the outer periphery. Between the boss 9'a and the outer periphery of the sleeve 9'c is provided an annularly tapered surface 9'd. The inner periphery of the sleeve 9'c surrounds the interlocking ferrule 1 on the rotational driving member a. A taper thrust ring 13' is fitted in an annular space defined by the cylindrical skirt 12', boss 9'a, and sleeve 9'c of the coupling cylinder 9'. The taper thrust ring 13' also includes three portions, i.e., an annular inclined edge 13'c in contact with torque-transmitting steel balls 22, an annular inclined edge 13'a directed opposite to the inclined edge 13'c, and a flat inner peripheral portion 13'b connecting the both inclined edges 13'c and 13'a. In the space formed between the annular inclined edge 13'a of the taper thrust ring 13' and the annular tapered surface 9'd, there are disposed small steel balls 15, which are held in position by a taper thrust ring 14 loosely fitted on the outer periphery of the sleeve 9'c of the coupling cylinder 9'. The taper thrust ring 14 is pressed against the small steel balls 15 by a pressure nut 17 threadedly engaged with the outside of the inner sleeve portion 9'c of the coupling cylinder 9'. Therefore, an axial force from the taper thrust ring 14 is transmitted to the taper thrust ring 13' through the steel balls 15. The torque-transmitting steel balls 22 are biased radially inward within the grooves 21 of the coupling cylinder 9' by the action of the taper thrust ring 13', and are engaged with the recesses of the interlocking ferrule I as shown in FIGS. 13 and 14. A stopper ring 11 is secured between the taper thrust ring 14 and the Belleville springs 16' and on the sleeve portion 9'c of the coupling cylinder 9'.

During normal operation, without overload, of the embodiment with the construction above described, the small steel balls 15 remain supported by three portions, i.e., the flat portion 14a of the taper thrust ring 14, the tapered portion 13'a of the taper thrust ring 13, and the tapered portion 9'd of the coupling cylinder 9'. In case of an unusual operation, or when an overload is applied, the torque-transmitting steel balls 22 move radially along the grooves 21, against the action of the elastic pressure means, and accordingly the contact points of the small thrust balls 15 shift from the tapered portion 13'a to the inner periphery 13'b of the taper thrust ring 13', until the pressure being exerted by the Belleville springs 16' and the pressure nut 17 is no longer transmitted to the torque-transmitting steel balls 22. This release mechanism elastically and positively sets the torque-transmitting steel balls in either resting or working position, thus permitting smooth and effective functioning of the torque limiter.

While preferred embodiments of the invention have been described using specific terms, such description is for illustrative purposes only, and it is to be understood that changes and variations may be made without departing from the spirit or scope of the following claims.

What is claimed is:

1. An elastic pressure device for torque-transmitting balls in a torque limiter of a construction such that a plurality of axially extending arcuate recesses are formed on the outer periphery of an interlocking ferrule fitted over a rotatable driving member; a coupling member having a plurality of radially extending grooves formed on the inner periphery thereof and matched with said arcuate recesses of said interlocking ferrule on said rotatable driving member; said coupling member being connected to an interlocking ferrule fitted over a driven member opposed to said driving member, each of said radial grooves having a torque-transmitting ball fitted therein so as to only move radially and rotate about its own axis while it is confined in motion in the revolving and axial directions, said torque-transmitting balls being biased diametrically inwardly by an elastic pressure means, which comprises a compression spring, a pressure nut, a first taper thrust ring, a group of small thrust balls, and a second taper thrust ring, so that the torque is transmitted from said rotatable driving member to said driven member and the two members are integrally driven together, said coupling cylinder being fastened by clamping bolts to said interlocking ferrule fitted over said driven member; said torque-transmitting balls being pressed against an inclined edge of said second taper thrust ring fitted in a cylindrical skirt of said couplng cylinder by said elastic pressure means, with a pressure exerted as said first taper thrust ring and said group of small thrust balls being pressed against an inclined edge on the inside of said second taper thrust ring by said compression spring under the urging of a pressure nut threadedly engaged with the outside of an inner sleeve portion of said coupling cylinder.

2. An elastic pressure device for torque-transmitting steel balls in a torque limiter according to claim 1, characterized in that said rotatable driving member and said associated interlocking ferrule are securely held together by Spanrings as connector elements, and said driven member and said associated interlocking ferrule are also held together by Spanrings as connector elements.

3. An elastic pressure device according to claim 1, characterized in that a stopper ring is secured to the inner sleeve portion of said coupling cylinder between said first taper thrust ring and said compression spring.

4. An elastic pressure device according to claim 1, characterized by a release mechanism which includes said group of small thrust balls which are subjected to an axial elastic force produced by said compression spring and said pressure nut and are supported during normal operation, or in the absence of overload, by three portions, i.e., a flat portion of said first taper thrust ring, a tapered portion of said second taper thrust ring, and a tapered portion of said coupling cylinder, and, in case of an unusual operation, or when an overload is applied, the pressure being exerted by said compression spring and said pressure nut is no longer transmitted to said torque-transmitting balls, because said torque-transmitting balls move radially along said grooves, against the action of said elastic pressure means, and the contact points of said thrust balls shift from said tapered portion of said second taper thrust ring to the inner periphery of said ring.

* * * * *